United States Patent
Eiha et al.

(10) Patent No.: US 7,833,451 B2
(45) Date of Patent: Nov. 16, 2010

(54) MOLD AND MOLDING METHOD

(75) Inventors: Noriko Eiha, Kanagawa (JP); Seiichi Watanabe, Kanagawa (JP); Yasuhito Hiraki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 299 days.

(21) Appl. No.: 11/656,942

(22) Filed: Jan. 24, 2007

(65) Prior Publication Data
US 2007/0170607 A1 Jul. 26, 2007

(30) Foreign Application Priority Data
Jan. 24, 2006 (JP) .............................. 2006-014999

(51) Int. Cl.
*B29C 41/00* (2006.01)
(52) U.S. Cl. .................. 264/230; 264/231; 264/239; 264/240; 264/299; 264/319; 264/320; 425/168; 425/352; 425/383; 425/395; 425/398; 425/403; 425/408; 425/418; 425/469; 425/470; 425/808; 292/170; 285/381.2
(58) Field of Classification Search .............. 285/381.2; 292/170; 425/408, 395, 808, 168, 352, 383, 425/398, 403, 418, 469, 470; 264/230, 231, 264/239, 240, 299, 319, 320
See application file for complete search history.

(56) References Cited

U.S. PATENT DOCUMENTS

| | | | | | |
|---|---|---|---|---|---|
| 4,701,293 | A | * | 10/1987 | Mead | 264/258 |
| 4,737,093 | A | * | 4/1988 | Hori et al. | 425/151 |
| 5,114,335 | A | * | 5/1992 | Tinsley | 425/577 |
| 7,381,047 | B2 | * | 6/2008 | Eiha et al. | 425/469 |
| 2007/0164465 | A1 | * | 7/2007 | Eiha et al. | 264/40.5 |

FOREIGN PATENT DOCUMENTS

| JP | 2000159528 A | * | 6/2000 |
|---|---|---|---|
| JP | 2003-231159 A | | 8/2003 |

* cited by examiner

Primary Examiner—Kat Wyrozebski
Assistant Examiner—Joshel Rivera
(74) Attorney, Agent, or Firm—Sughrue Mion, PLLC

(57) ABSTRACT

In a mold, at least a first half includes an insert member forming a cavity surface on one end side; a body member having an insertion part into which the insert member is inserted; and an insert member fixer interposed between the insert member and the insertion part, for holding the insert member. The insert member fixer is made of a shape memory alloy, and presses and holds the insert member when the insert member fixer restores its memorized shape, to make a center axis alignment of the insert member with respect to the body member.

12 Claims, 9 Drawing Sheets

MOLD AND MOLDING METHOD

CROSS REFERENCE TO RELATED APPLICATIONS

This application claims the benefit of Japanese Patent Application No. 2006-014999 filed on Jan. 24, 2006, the disclosure of which is incorporated herein by reference.

BACKGROUND OF THE INVENTION

1. Field of the Invention

The present invention relates to a mold and a molding method.

2. Description of the Related Art

As a mold capable of manufacturing a product such as a digital camera and a telescopic lens which requires machining with extremely high accuracy, for example, a mold, as shown in FIG. 9, has been known which has a cavity between a first half 600 and a second half 700, and such a product is injection-molded in the cavity (see, for example, Japanese Published Patent Application No. 2003-231159, paragraphs 0020-0029, FIG. 1).

The first half 600 includes an insert member 610 forming a cavity surface 610a; a body member 620 for holding the insert member 610 from outside and having a tapered protrusion 621 on an end face thereof on the side of the second half 700, and a ball retainer 630 interposed between the insert member 610 and the body member 620. The second half 700 includes an insert member 710 forming a cavity surface 710a; a body member 720 for holding the insert member 710 from outside and having a reversely tapered part 721 on an end face thereof on the side of the first half 600; and a ball retainer 730 interposed between the insert member 710 and the body member 720.

In the mold described above, the interposition of the ball retainers 630, 730 enables the center axis alignment between the insert member 610 and the body member 620 and between the insert member 710 and the body member 720 respectively, and, in the meantime, the use of the tapered protrusion 621 and the reversely tapered part 721 enables the center axis alignment between the first half 600 and the second half 700.

In determining a performance of a lens as a product molded in such a mold, it is extremely important that a center axis alignment is achieved between an optical surface of the lens and a flange integrally molded with the optical surface around the same. In other words, it is desired that the center axis alignment is achieved between the insert member 610 providing the optical surface and the body member 620 providing the flange. If the center axis alignment is not achieved between the optical surface and the flange, namely, between the insert member 610 and the body member 620, an eccentricity of the lens can easily occur, leading to performance deterioration and a cost increase of the same.

In the meantime, the conventional mold described above has problems as follows. When the insert member 610 and the insert member 710 are joined together, it is necessary but troublesome to insert the insert member 610 into the body member 620, for example, while adjusting a positional relation between the ball retainer 630 and the insert member 610 so that the ball retainer 630 be provided in a predetermined position.

Another problem is that, though depending on tolerance or rigidity of the ball retainer 630, an eccentricity of the insert member 610 may occur, making it difficult to achieve the center axis alignment between the insert member 610 and the body member 620.

The present invention is made in the light of the above-mentioned problems, and it is desirable to provide a mold and molding method whose insert member can be smoothly joined together with a body member, whose center axis alignment can be easily performed, and with which a high-quality product can be manufactured.

SUMMARY OF THE INVENTION

The present invention provides a mold in which a cavity is formed between at least a first half and a second half, and a product is molded in the cavity. The first half includes at least an insert member forming a cavity surface on one end side; a body member having an insertion part into which the insert member is inserted; and an insert member fixer interposed between the insert member and the insertion part of the body member, for holding the insert member. The insert member fixer is made of a shape memory alloy, and performs a center axis alignment of the insert member with respect to the body member by restoring a memorized shape thereof to press and hold the insert member.

In this configuration, the insert member fixer made of a shape memory alloy holds the insert member, and, when the insert member fixer restores its memorized shape, presses and holds the insert member to thereby achieve the center axis alignment of the insert member with respect to the body member. Therefore, the center axis alignment of the insert member can be easily achieved just by heating the insert member fixer to a predetermined temperature when a product is molded. It is to be noted that the terms "when a product is molded" used herein include the steps from filling a resin through curing a product made of the resin. Further, the insert member fixer restores its memorized shape to press and hold the insert member, so that, before the insert member fixer restores its memorized shape, the insert member fixer does not press nor hold the insert member, namely, the insert member can be inserted into and pulled out of the insertion part of the main body. That is, when the mold is set up, the insert member can be smoothly inserted into and pulled out of the insertion part, and, in the meantime, when a product is molded, the insert member can suitably achieve the center axis alignment.

It is desirable that the insert member fixer has a transformation temperature thereof higher than room temperature and lower than a temperature of the mold when a product is molded using at least the first half.

In this configuration, the transformation temperature of the insert member fixer is set to be higher than room temperature and lower than the mold temperature when a product is molded using at least of the first half, so that, when the first hall is heated when a product is molded, the heating restores the memorized shape of the insert member fixer, and the insert member is pressed and held automatically. This means that heating control over the insert member fixer is not necessary, and existing facilities can be used for performing the center axis alignment of the insert member, which also enables a reduction in a facility cost.

It is also desirable that the transformation temperature of the insert member fixer is set, at least in the first half, a mold temperature during filling a resin and that when a product is demolded.

With this configuration, the transformation temperature of the insert member fixer is set, at least in the first half, between a mold temperature during filling a resin and that when the product is demolded, so that, before filling the resin when the product is molded, the insert member fixer restores its memorized shape, which enables that the resin is filled in a state where the center axis alignment of the insert member is suitably achieved. This allows the product to be manufactured with high precision.

Additionally, when the product is demolded, the insert member fixer does not press nor hold the insert member, so that the insert member can be easily inserted and pulled out, and a mechanism for demolding the product is simplified to thereby reduce a manufacturing cost.

The insert member fixer may have gathers, each of which protrudes toward the insert member in a state where a memorized shape thereof is restored, at least when a product is molded, and presses and holds a peripheral wall of the insert member inside an inner wall of the insertion part to thereby hold the insert member. Or the insert member fixer may hold an outer circumference of the insert member at least in three directions. Alternatively, the insert member fixer may have a coiled form, wound around the peripheral wall of the insert member, and an inner diameter of the insert member fixer is reduced in a state where the insert member fixer restores its memorized shape when a product is molded, to press and hold the insert member inside the inner wall of the insertion part.

With this configuration, before the insert member fixer restores its memorized shape, the insert member can be easily inserted and pulled out, and, after the insert member fixer restores its memorized shape, the center axis alignment of the insert member can be performed automatically.

The insert member fixer may be integrated with either the body member or the insert member.

In the mold described above, a step of setting up the insert member fixer can be omitted, which enables a simple setup and an enhanced productivity. In addition, the number of components is decreased, which enables a cost reduction in machining and an enhanced handling of the components.

Further, since the insert member fixer is integrated with either the body member or the insert member, accuracy in the setup is enhanced, and that in molding a product is also enhanced.

The insert member fixer and the body member, or the insert member fixer and the insert member may be integrated together using a single component, or may be integrated together using a plurality of components by means of shrink fitting or the like.

The molding method according to the present invention is carried out by a mold having a cavity at least between a first half and a second half, and molding a product in the cavity. The first half includes at least an insert member forming a cavity surface on one end side; a body member having an insertion part into which the insert member is inserted; and an insert member fixer made of a shape memory alloy, interposed between the insert member and the insertion part of the body member, and performing the center axis alignment of the insert member. In the first half, a restoring force generated when the insert member fixer restores its memorized shape presses and holds the insert member against the insertion part in the state where the center axis alignment between the insert member and the body member is achieved.

The molding method according to the present invention is characterized in that the restoring force generated when the insert member fixer made of a shape memory alloy restores its memorized shape is utilized to press and hold the insert member against the insertion part. With this configuration, the insert member can be easily inserted and pulled out, and, after the insert member fixer restores its memorized shape, the center axis alignment of the insert member can be performed automatically.

BRIEF DESCRIPTION OF THE DRAWINGS

FIG. 1A is a plane view of the mold, and FIG. 1B is a cross sectional view of the mold when cut along the line A-A in FIG. 1A.

FIG. 3A is a plane view of the mold showing a state of an insert member fixer before an insert member is inserted thereinto. FIG. 3B is a plane view of the mold showing a state of the insert member fixer after the insert member is inserted thereinto.

DETAILED DESCRIPTION OF EXEMPLARY EMBODIMENT

Figure 1A:
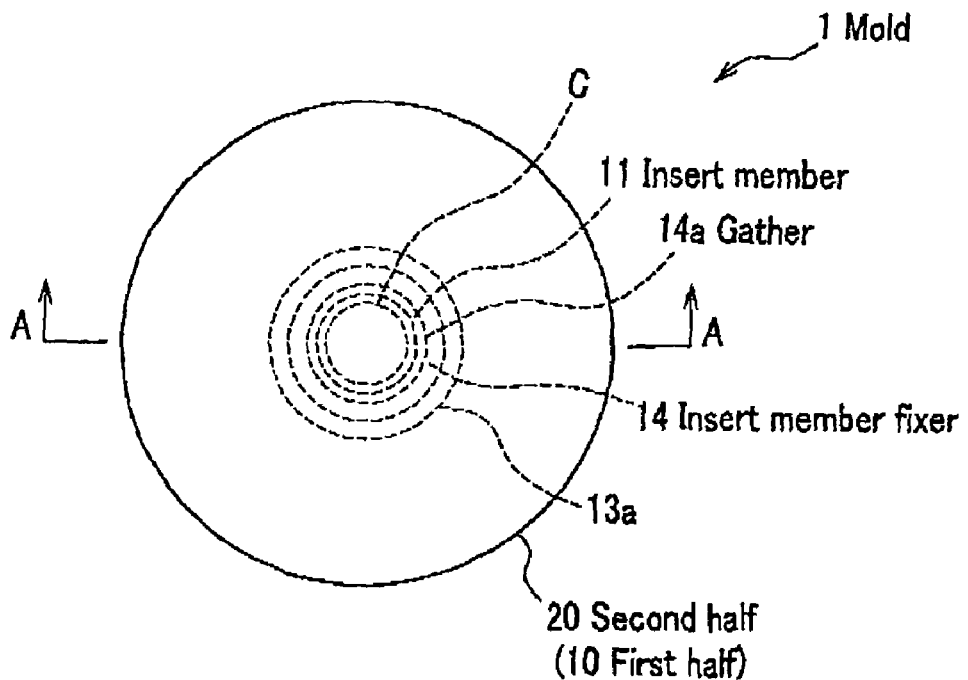
FIG. 1A and FIG. 1B are views each showing a mold according to a first embodiment of the present invention.

Exemplary embodiments for carrying out the present invention are described next in detail with reference to the related drawings. In the descriptions below, the same reference numerals are assigned to the same components, and the overlapped description is omitted. The embodiments are described assuming a case where the present invention is applied to manufacturing a lens, which is an optical component. The present invention can be suitably used especially for molding an optical component which requires a high form accuracy, such as a frame for an optical lens.

First Embodiment

A configuration of a mold according to a first embodiment is described next.

Figure 1B:
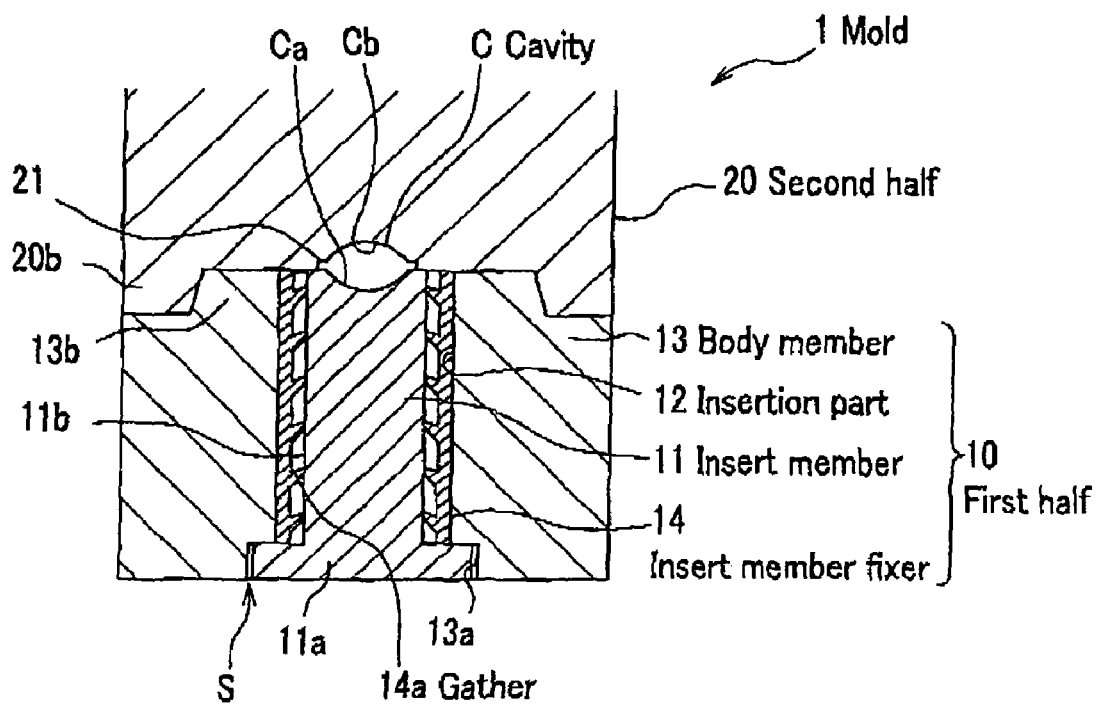

In the drawings to be referred to herein, FIG. 1A and FIG. 1B are views each showing a mold according to the first embodiment of the present invention. FIG. 1A is a plane view of the mold, and FIG. 1B is a cross sectional view of the mold when cut along the line A-A in FIG. 1A.

As shown in FIG. 1B, a mold 1 has a cavity C formed between a first half 10 and a second half 20, and a lens as a product is molded in the cavity C.

As shown in FIG. 1B, the first hall 10 includes an insert member 11 having a portion of a cavity surface (to be referred to hereinafter as a cavity surface Ca) on one end side; a body member having an insertion part 12 into which the insert member 11 is inserted; and a metal insert member fixer 14 interposed between the insert member 11 and the body member 13.

The insert member 11 is a columnar metal member (whose cross section has a circular form), is configured separately from the body member 13, and is held in the insertion part 12 of the body member 13 via the insert member fixer 14. The insert member 11 is attached on a fixed side of an injection molding machine not shown.

The body member 13 is a cylindrical metal member for holding the insert member 11 via the insert member fixer 14 from outside, and has in the center thereof the insertion part 12 into which the insert member 11 is inserted. The insertion part 12 of the body member 13 is formed to have a size to loosely fit in with the insert member 11, into which the insert member fixer 14 can be interposed. One end (on the upper side in FIG. 1B, hereinafter the same) of the insertion part 12 opens on the one end side of the body member 13. When the insert member 11 is inserted into the insertion part 12, the cavity surface Ca formed on the one end of the insert member 11 exposes on a face on the one end side of the body member 13. In the meantime, the other end (on the lower side in FIG. 1B, hereinafter the same) of the insertion part 12 opens on an end face of the other end of the body member 13, into which the insert member 11 can be inserted. In an insertion opening of the insertion part 12 is formed a concave part 13a, with which a flange part 11a of the insert member 11 is fitted in, leaving a slight space S. The space S allows the insert member 11 to move in a radial direction, when a center axis alignment of the insert member 11 to be hereinafter described is performed. A flange part 11a fitted in with the concave part 13a prevents the insert member 11 from entering too far in an insertion direction thereof, and sets a protrusion of the cavity Ca toward the second half 20 to a predetermined quantity.

The first half 10 further includes a tapered protrusion 13a to fit in with the second half 20.

The insert member fixer 14 made of a shape memory alloy and interposed between the insertion part 12 of the body member 13 and the insert member 11 holds the insert member 11, and provides the center axis alignment of the insert member 11 with respect to the body member 13. The insert member fixer 14 is cylindrical, whose inner wall has gathers 14a each protruding from all circumferences thereof (see FIG. 1A). Each gather 14a has a wedge-shaped cross section, protrudes toward the insert member 11 when a memorized shape thereof is restored, and presses a peripheral wall 11b of the insert member 11 inside an inner wall of the insertion part 12 to thereby hold the insert member 11. In this embodiment, a transformation temperature of the gathers 14a at which the gathers 14a restore the memorized shape is set based on a mold temperature at which at least the first half 10 is heated when a product is molded, and, more specifically, is set between ambient temperature (room temperature) and the mold temperature when a product is molded. In other words, the insert member fixer 14 is made of a shape memory alloy which transforms its shape at a temperature between ambient temperature (room temperature) and the mold temperature (to be set at a constant temperature), when a product is molded. This allows the gathers 14a to be flexible and deformable, and also allows the insert member 11 to be inserted and pulled out.

The insert member fixer 14 may be fixed into the insertion part 12, and may be dismountably provided in the insertion part 12. It is to be noted that, in this embodiment, the body member 13 of the first half 10 is provided around the insert member fixer 14, so that the body member 13 of the first half 10 also serves as a backup member for stably holding the insert member fixer 14.

The shape memory alloy used herein includes various materials with an inherent shape restoring ability such as Ni—Ti, Ni—Ti—Co, Ni—Ti—Cu and Fe—Mn—Si. It is desirable to use a Ni—Ti based material with which a transformation temperature can be varied in a wide range. A thermal property of the shape memory alloy is well known, and a detailed description thereof is omitted herefrom.

The second half 20 includes a portion of a cavity surface (referred to as a "cavity surface Cb" hereinafter) on a face thereof opposed to the first half 10, as shown in FIG. 1B. In this embodiment, the second half 20 further includes a concave part 21 for molding a flange of a lens on the cavity surface Cb. The second half 20 includes a reversely tapered part 20b to fit in with the tapered protrusion 13b of the first half 10, which enables a center axis alignment between the first half 10 and the second half 20. The second half 20 has a runner and a gate both not shown communicating with the cavity surface Cb.

A pushout pin not shown for pushing out a molded product from the cavity C is provided on the other side of the second half 20 (on the lower side of the second half 20). The pushout pin may include a pin and an elastic body for pressing the pin toward the first half 10, and thereby protrudes from the cavity surface Cb toward the first half 10 when the product is demolded. The pushout pin is not limited to be provided on the second half 20, and can be provided on the first half 10.

As shown in FIG. 1B, the mold 1 described above achieves the center axis alignment between the first half 10 and the second half 20, when the tapered protrusion 13b of the first half 10 is fitted in with the reversely tapered part 20b of the second half 20. Further, when the first half 10 and the second half 20 are pressed against each other, the cavity surfaces Ca, Cb are joined together to form the cavity C.

Operations of the mold 1 according to this embodiment are described next.

Figure 2:
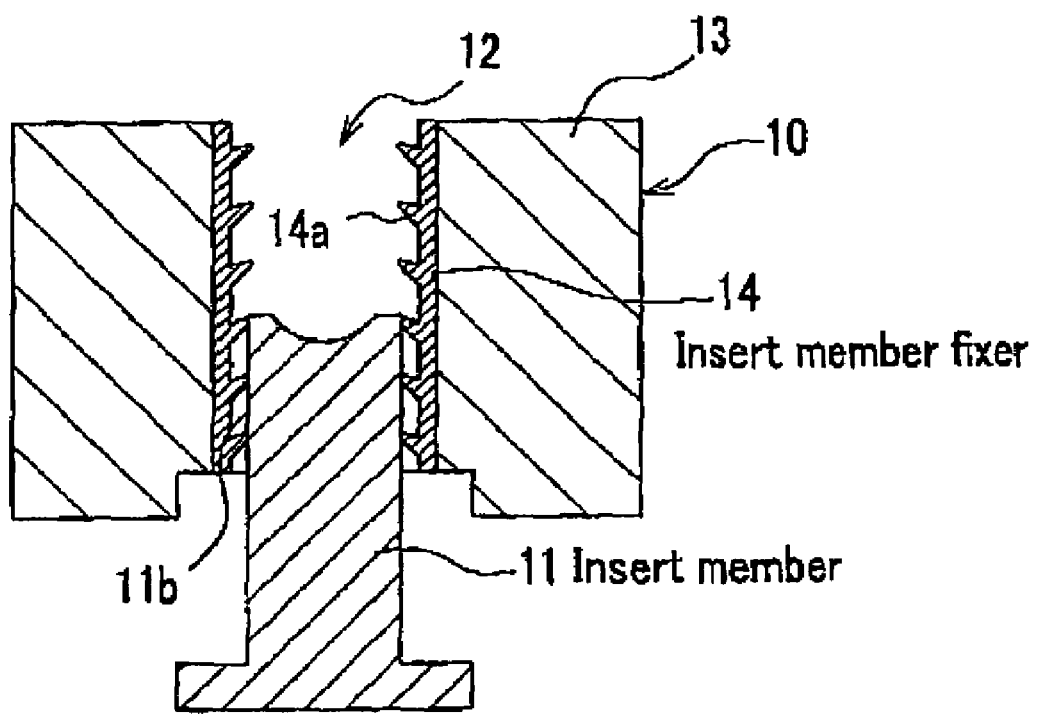
FIG. 2 is a view explaining operation of the mold according to the first embodiment.

An operation of inserting the insert member 11 into the body member 13 is carried out by inserting the insert member 11 into an opening on the other end of the insertion part 12 of the first half 10, as shown in FIG. 2. At this time, the temperature of the first half 10 is set to be below room temperature, that is, below the transformation temperature of the gathers 14a, at which the gathers 14a of the insert member fixer 14 are flexible and deformable. Thus, as the insert member 11 is inserted into the insertion part 12, the gathers 14a contact a top end of the insert member 11 to fall over in a direction of inserting the insert member 11. This makes it possible for the insert member 11 to be smoothly inserted into the insertion part 12. Additionally, the gathers 14a of the insert member fixer 14 flexibly holds the peripheral wall 11b of the insert member 11 while falling over in the direction of inserting the insert member 11, so that a moderate resistance is applied to the insert member 11. This enables alleviating a violent hit between the top end of the insert member 11 and each gather 14a, preventing the top end of the insert member 11 from damaging.

It is to be noted that the insert member 11 can be inserted into the insertion part 12 either before or after the first half 10 and the second half 20 are joined together.

After the insert member 11 is inserted well into the insertion part 12, the mold 1 is attached on a molding machine not shown, and the first half 10 and the second half 20 are heated to a predetermined temperature. More specifically, the first half 10 and the second half 20 are heated to a temperature exceeding the transformation temperature of the insert member fixer 14, which is set between room temperature and the temperature of the mold 1 when a product is molded. After the first half 10 is heated to the predetermined temperature, the gathers 14a of the insert member fixer 14 restores the memorized shape. This enables the gathers 14a to protrude toward the insert member 11. Then the peripheral wall 11b of the insert member 11 is pressed and held by the gathers 14a of the insert member fixer 14, to thereby achieve the center axis alignment of the insert member 11 with respect to the body member 13, which results in molding a product with high accuracy.

When the mold 1 is set up, the temperature of the first half 10 is below that of transformation of the gathers 14a of the insert member fixer 14. At the temperature, the insert member the insert member fixer 14 is flexible and deformable. This makes it possible to smoothly pull out the insert member 11.

In the mold 1 according to this embodiment described above, the center axis alignment of the insert member 11 can be easily achieved just by heating the insert member fixer 14 when a product is molded, because the insert member fixer 14 made of a shape memory alloy holds the insert member 11, and, when the insert member fixer 14 restores its memorized shape, the gathers 14a press and hold the insert member 11 to thereby perform the center axis alignment of the insert member 11 with respect to the body member 13. In addition, because the insert member fixer 14 presses and holds the insert member 11 only when the insert member fixer 14 restores its memorized shape, the insert member fixer 14 does not press nor hold the insert member 11 before the insert member fixer 14 restores its memorized shape, which allows the insert member 11 to be inserted into and pulled out from the insertion part 12 of the body member 13. That is, when the mold 1 is set up, the insert member 11 can be easily inserted or pulled out, and, in the meantime, when a product is molded, the insert member 11 can suitably achieve the center axis alignment.

The temperature of the insert member fixer 14 rises to a predetermined transformation temperature just by heating the first half 10, so that the gathers 14a automatically press and hold the insert member 11. Thus, heating control of the insert member fixer 14 is not necessary, and existing facilities can be used for easily performing the center axis alignment of the insert member 11. This can contribute to a cost reduction in facilities.

Second Embodiment

Figure 3A:
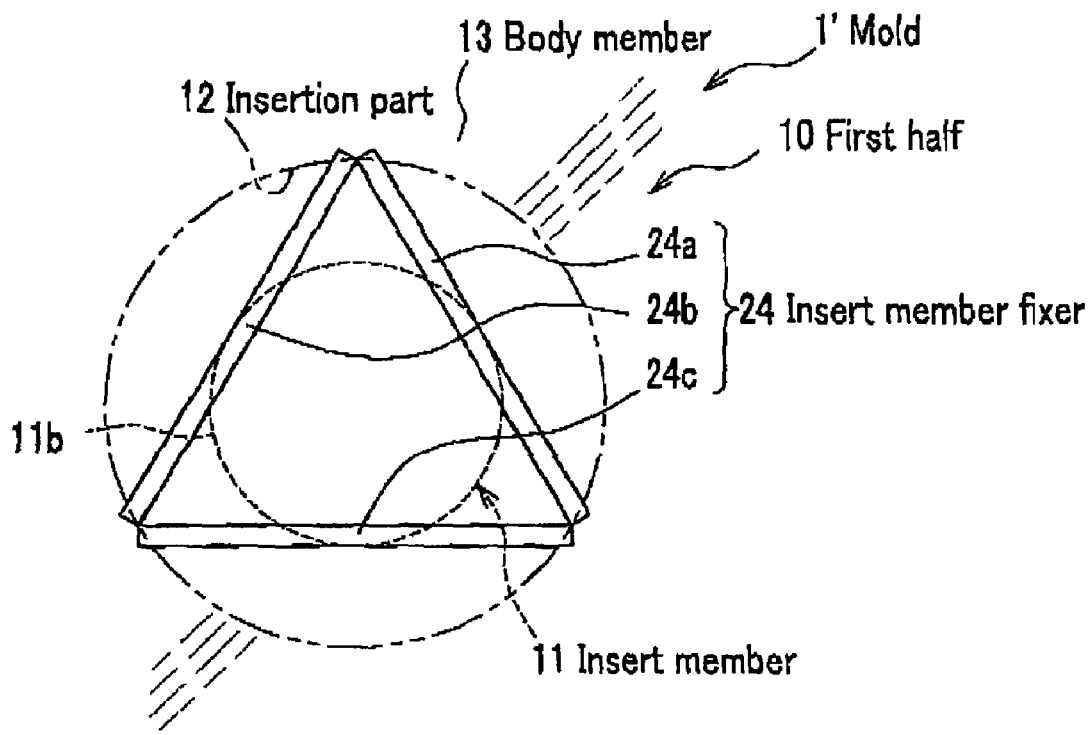
FIG. 3A and FIG. 3B are views each showing a mold according to a second embodiment.
Figure 3B:
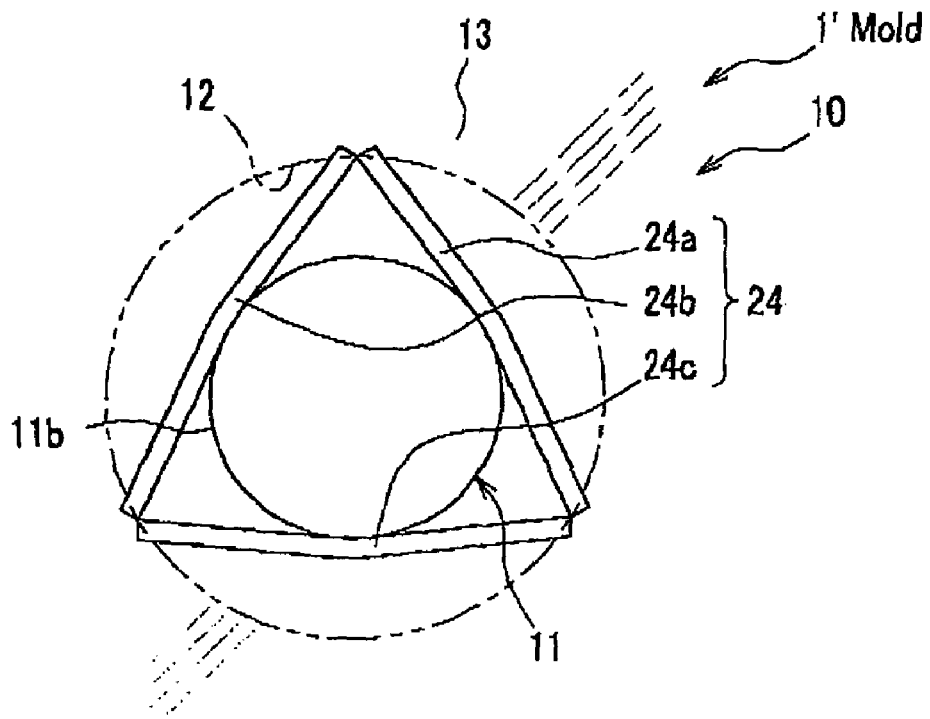

FIG. 3A and FIG. 3B are views each showing a mold according to a second embodiment. FIG. 3A is a plane view of the mold showing a state of an insert member fixer before an insert member is inserted thereinto. FIG. 3B is a plane view of the mold showing a state of the insert member fixer after the insert member is inserted thereinto.

The mold 1' is the same as the mold 1 (see FIG. 1A and FIG. 1B) according to the first embodiment, except that an insert member fixer 24 according to the second embodiment is constituted by three plate-like bodies 14a, 14b, 14c. Further, mold 1' is controlled so that a temperature thereof changes when a product is molded. The transformation temperature of the insert member fixer 24 is set between the temperature of the mold 1' during filling a resin to be described hereinafter and that when the product is demolded. In the embodiment, the insert member 11 is movable (can be ejected). The first half 10 is attached to a movable side of an injection molding machine not shown.

The plate-like bodies 24a, 24b, 24c are provided in the insertion part 12 of the body member 13 to hold the periphery wall 11b of the insert member 11 at least in three directions, and are fixed onto an inner wall of the insertion part 12 so as to form a substantially equilateral triangle when viewed from above. The transformation temperature of the plate-like bodies 24a, 24b, 24c is each set between the mold temperature during filling a resin and that when the product is demolded. More specifically, the transformation temperature is slightly higher than the mold temperature when the product is demolded. At the temperature, each of the plate-like bodies 24a, 24b, 24c has a form of a plate, when restores its memorized shape. As shown in FIG. 3A, when the insert member 11 is not inserted, the plate-like bodies 24a, 24b, 24c are provided so that each surface of the same opposed to the insert member 11 (the each surface in contact with the periphery wall 11b of the insert member 11 and holding the insert member 11) is positioned on an inner side than the peripheral wall 11b of the insert member 11, as shown in FIG. 3A. In the meantime, when the insert member 11 is inserted, as shown in FIG. 3B, each of the plate-like bodies 24a, 24b, 24c can be curved on the side of the insertion part 12.

Figure 4A:
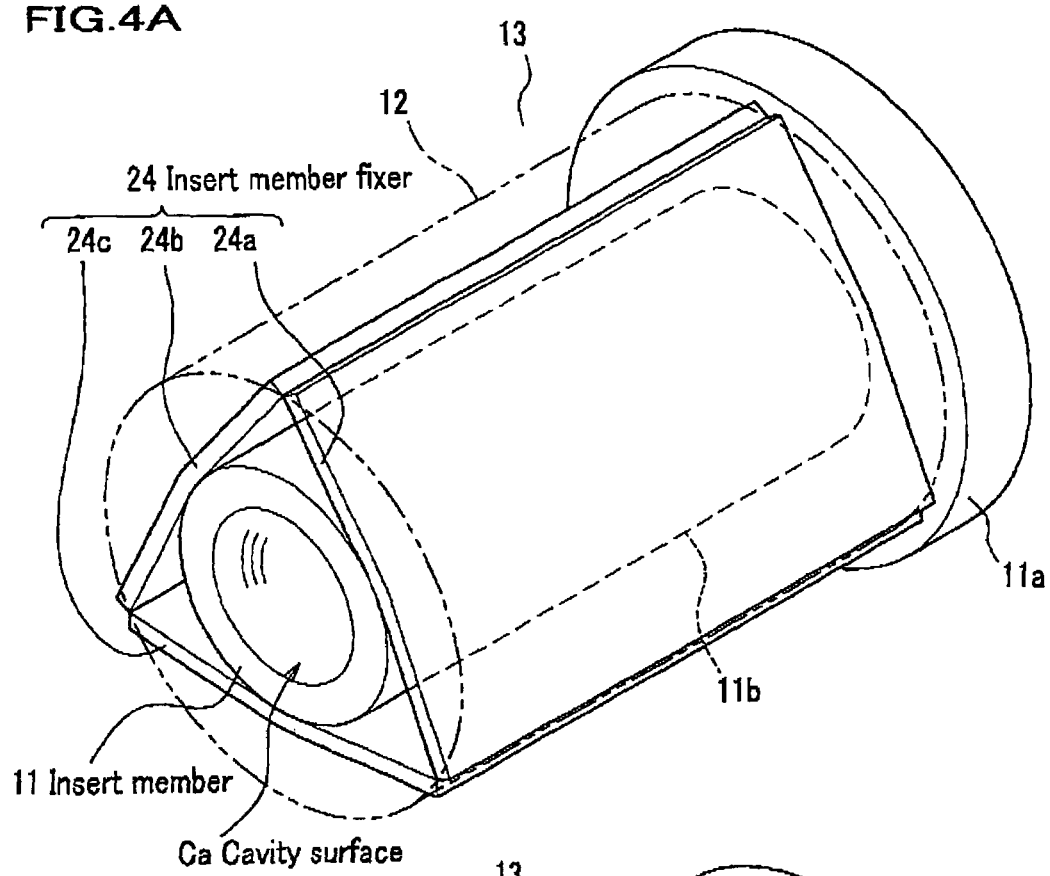
FIG. 4A is a schematic perspective view explaining the insert member fixer.

In the mold 1' according to this embodiment described above, as shown in FIG. 3B, the insert member 11 can be pulled out by the curvable and deformable plate-like bodies 24a, 24b, 24c, when a product is demolded. In the meantime, when a product is molded, the first half 10 is heated to thereby raise the temperature of the plate-like bodies 24a, 24b, 24c to the transformation temperature thereof or above. Then a restoring force of the plate-like body 24a, 24b, 24c, to each restore its shape of a plate (a memorized shape) acts on the insert member 11, so that the insert member 11 is suitably pressed and held (see FIG. 4A). This enables the insert member 11 to be smoothly inserted and pulled out, to thereby provide the mold 1' in which a high-quality molded product can be manufactured.

Additionally, the insert member fixer 14 has a simpler configuration, because of being constituted by the three plate-like bodies 24a, 24b, 24c, and requires a reduced facility cost.

The memorized shape of the plate-like bodies 24a, 24b, 24c can be set in any shape, as long as the plate-like bodies 24a, 24b, 24c can press and hold the insert member 11 when a product is molded. The number of plate-like bodies may be four or more.

Since the transformation temperature of the insert member fixer 24 is set between the mold temperature during filling a resin and that when a product is demolded, the insert member fixer 14 restores its memorized shape before the resin is filled when a product is molded. Namely, the resin is filled after the center axis alignment of the insert member 11 is suitably achieved, which allows to manufacture the molded product with high precision.

When the product is demolded, the insert member fixer 24 does not press nor hold the insert member 11 any more, which allows a simpler mechanism for demolding the product and a reduced cost.

In the embodiment, both ends of each of the three plate-like bodies 24a, 24b, 24c are respectively held on the inner wall of the insertion part 12 of the body member 13. However, the configuration is not limited thereto. Only one of the two ends of each of the plate-like bodies 24a, 24b, 24c may be held on the inner wall of the insertion part 12 respectively, serving as a cantilever, and a restoring force of the plate-like bodies 24a, 24b, 24c, can press and hold the insert member 11 like plate springs. In this case, the restoring force potently acts in a direction in which the plate-like bodies 24a, 24b, 24c are bent, and can be utilized to suitably press and hold the insert member 11.

Figure 4B:
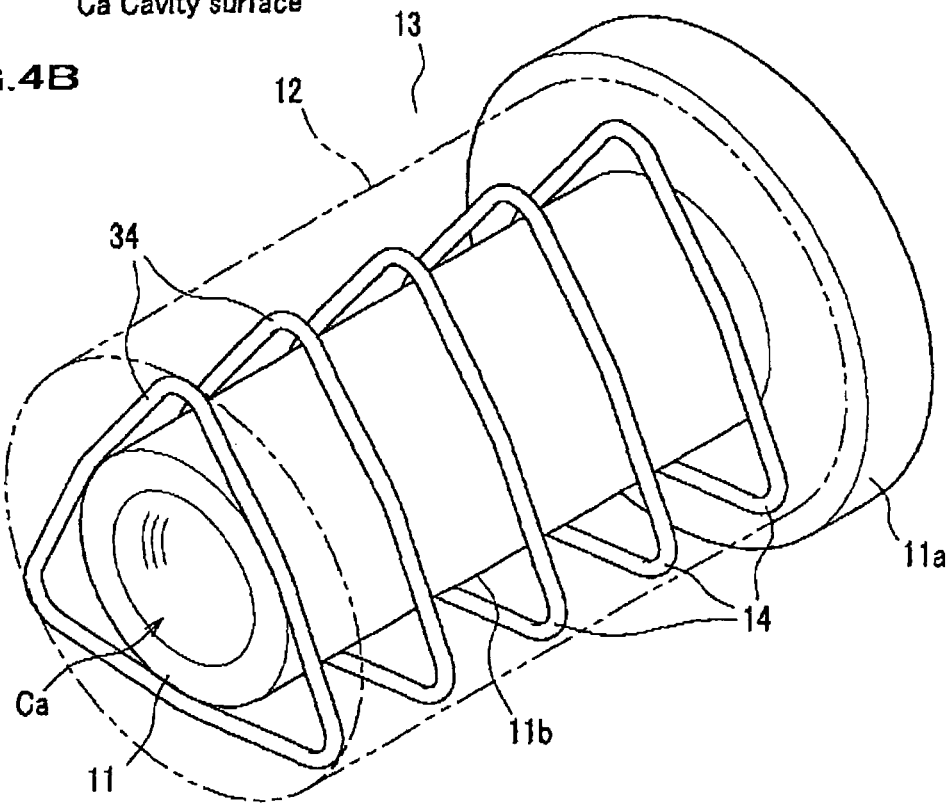
FIG. 4B is a schematic perspective view showing a variant of the insert member fixer.

FIG. 4B is a schematic perspective view showing a variant of the insert member fixer 24. In this example, an insert member fixer 34 is composed of wire rods, instead of the plate-like bodies 24a, 24b, 24c described above.

The wire rods composing the insert member fixer 34 can also be curved and deformed as the plate-like bodies 24a, 24b, 24c, when a product is demolded, which enables an easy insertion and pulling out of the insert member 11. In addition, when a product is molded, each portion constituting the insert member fixer 34 is set to restore a shape of a linear form (a memorized shape), in a state where at least the first half 10 is heated to a temperature slightly higher than that of the mold 1' when the product is demolded. Thus the force to restore its shape of the linear form suitably presses and holds the insert member 11.

By using the insert member fixer 34 described above, the mold 1' can have a simpler configuration, and a facility cost can be further reduced.

When such wire rods are used, the temperature of the insert member fixer 34 changes substantially uniformly, and the insert member fixer 34 can have an excellent lifetime against repeated deformations.

It is to be noted that the wire rods may be provided around the insert member 11 in a spiral manner. Length and thickness of the wire rods can be set without limitation, as long as the wire rods can press and hold the insert member 11 when a product is molded.

The exemplary embodiments for carrying out the present invention are described above in detail with reference to the drawings. However, the present invention is not limited to these embodiments, and can be modified in a range without departing from a gist of the present invention.

Figure 5:
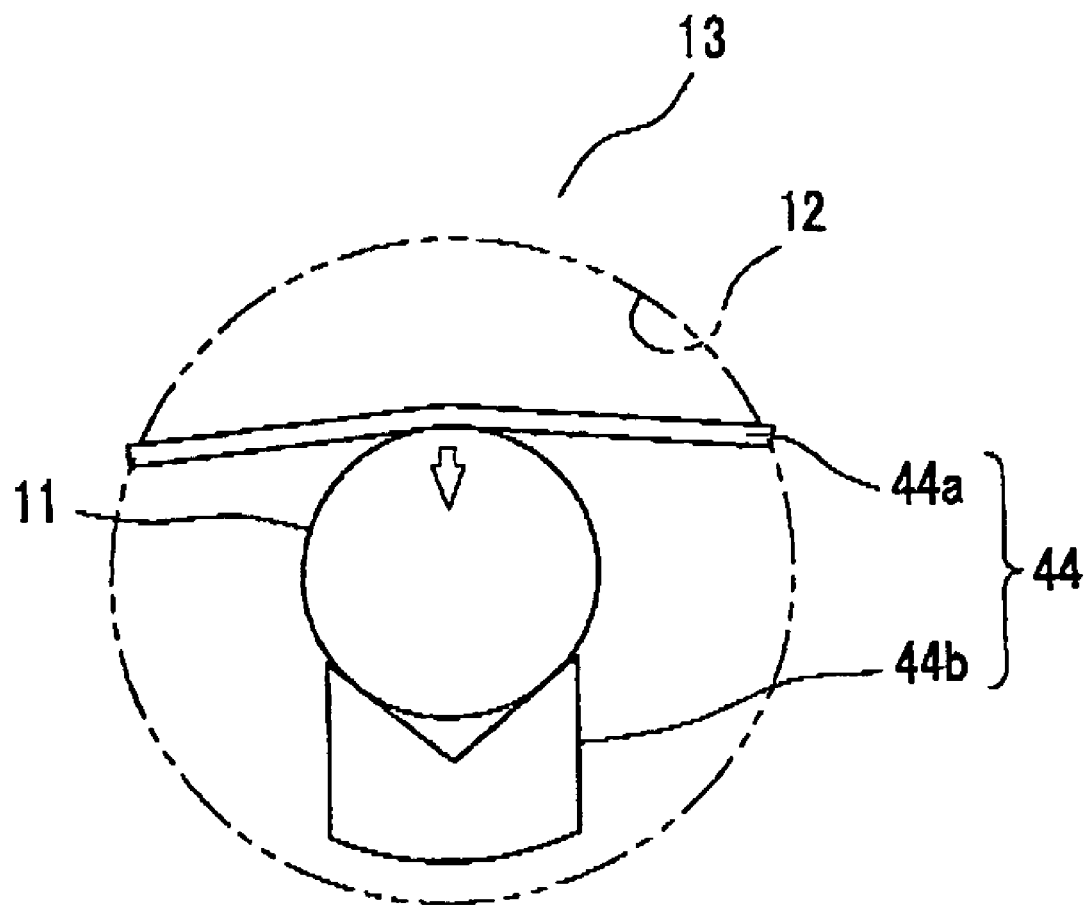
FIG. 5 is a schematic plane view showing another insert member fixer.

For example, as shown in FIG. 5, an insert member fixer 44 may be constituted by a plate-like body 44a made of a shape memory alloy, and a notched support member 44b. When a product is molded, a restoring force of the plate-like body 44a to restore its shape of a plate-like form (a memorized shape) presses and holds the insert member 11 toward the support member 44b. Thus, the plate-like body 44a together with the support member 44b suitably press and hold the insert member 11 in three directions. It is to be noted that both ends of the plate-like body 44a may be held on the inner wall of the insertion part 12 of the body member 13. Any one of the two ends may be held on the inner wall of the insertion part 12 serving as a cantilever.

Figure 6A:
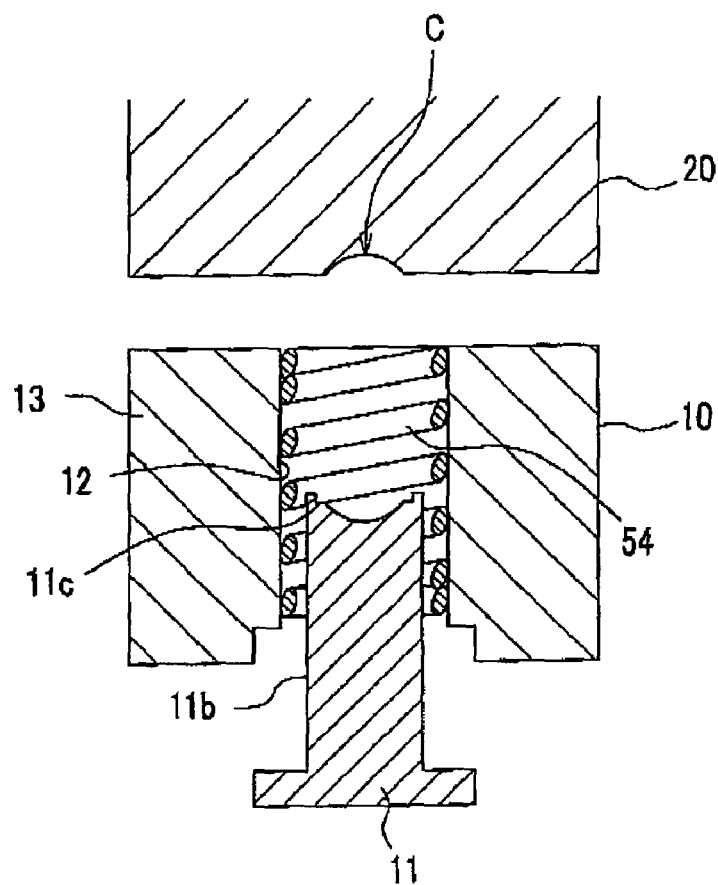
FIG. 6A and FIG. 6B are schematic cross sectional views each explaining a still another example of the insert member fixer.
Figure 6B:
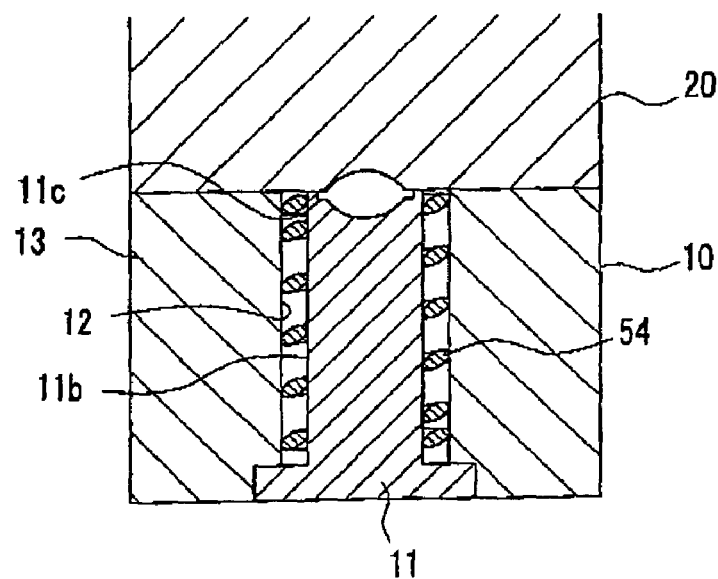

As shown in FIG. 6A, an insert member fixer 54 may be made of wire rods having an elliptic cross section, and have a coiled form, wound around the peripheral walk 11b of the insert member 11. In this case, as shown in FIG. 6B, the insert member fixer 54 is set to restore its memorized shape when a product is molded, and to turn a direction of the wire rods having the elliptic cross section to that in which each inner diameter of the wire rods is reduced. This enables the insert member 11 to be pressed and held suitably. It is to be noted that, in each example shown in FIG. 6A and FIG. 6B, the insert member 11 is provided with a concave part 11c for molding a flange of a lens.

Figure 7A:
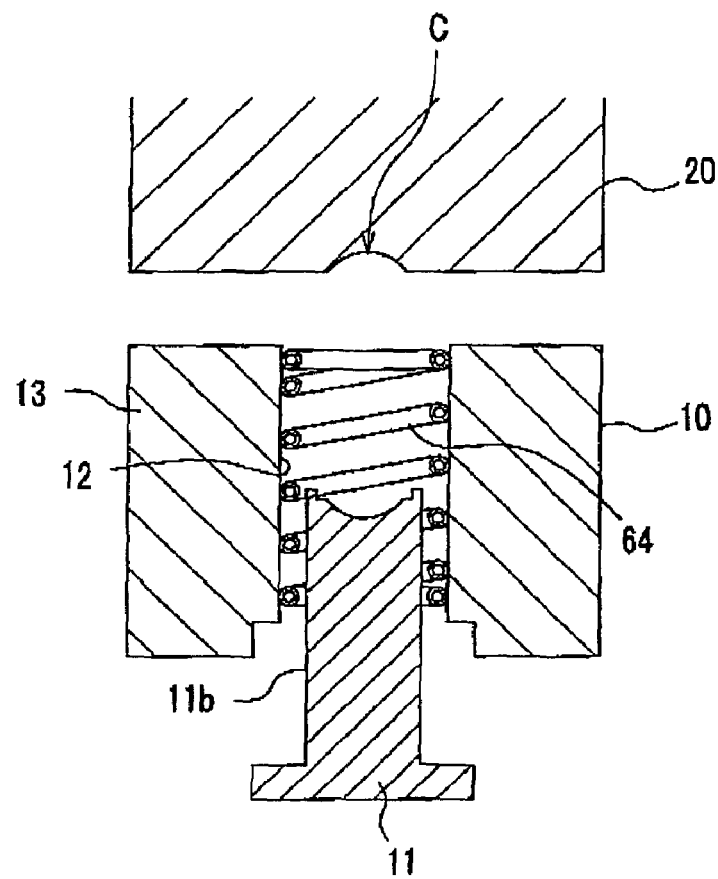
FIG. 7A and FIG. 7B are views schematic cross sectional views each explaining a still yet another example of the insert member fixer.
Figure 7B:
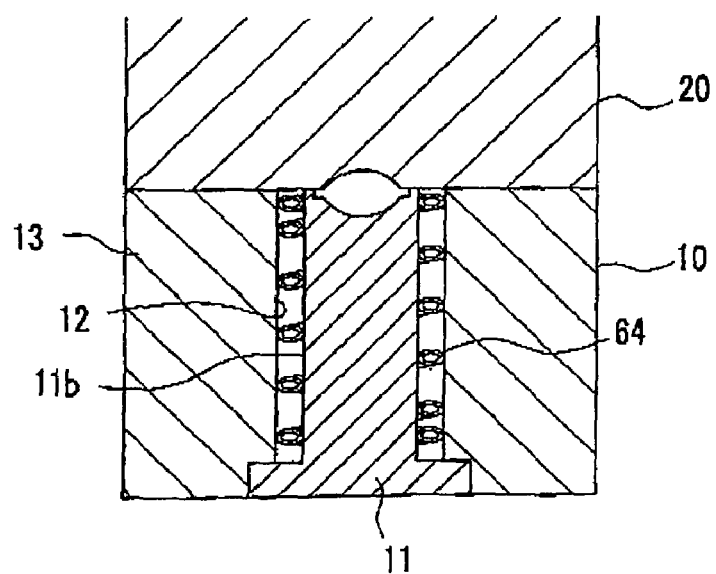

As shown in FIG. 7A, the insert member fixer 64 may be composed of wire rods having a cylindrical cross section, and have a coiled form, wound around the peripheral wall 11b of the insert member 11. In this case, as shown in FIG. 7B, when the wire rods having a cylindrical cross section are set to restore its memorized shape when a product is molded, and to turn the cylindrical cross section into an elliptic cross section. This enables the insert member 11 to be pressed and held suitably.

Figure 8:
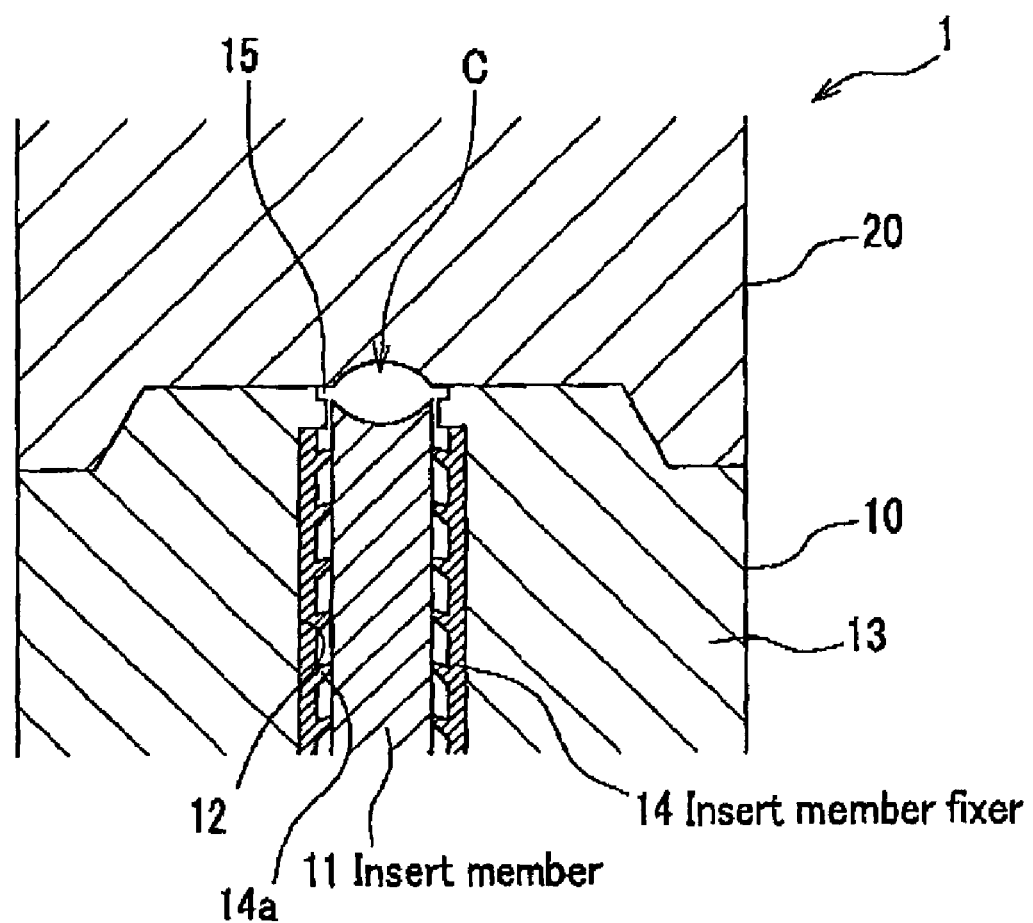
FIG. 8 is a schematic cross sectional view showing a variant of the insert member fixer.
Figure 9:
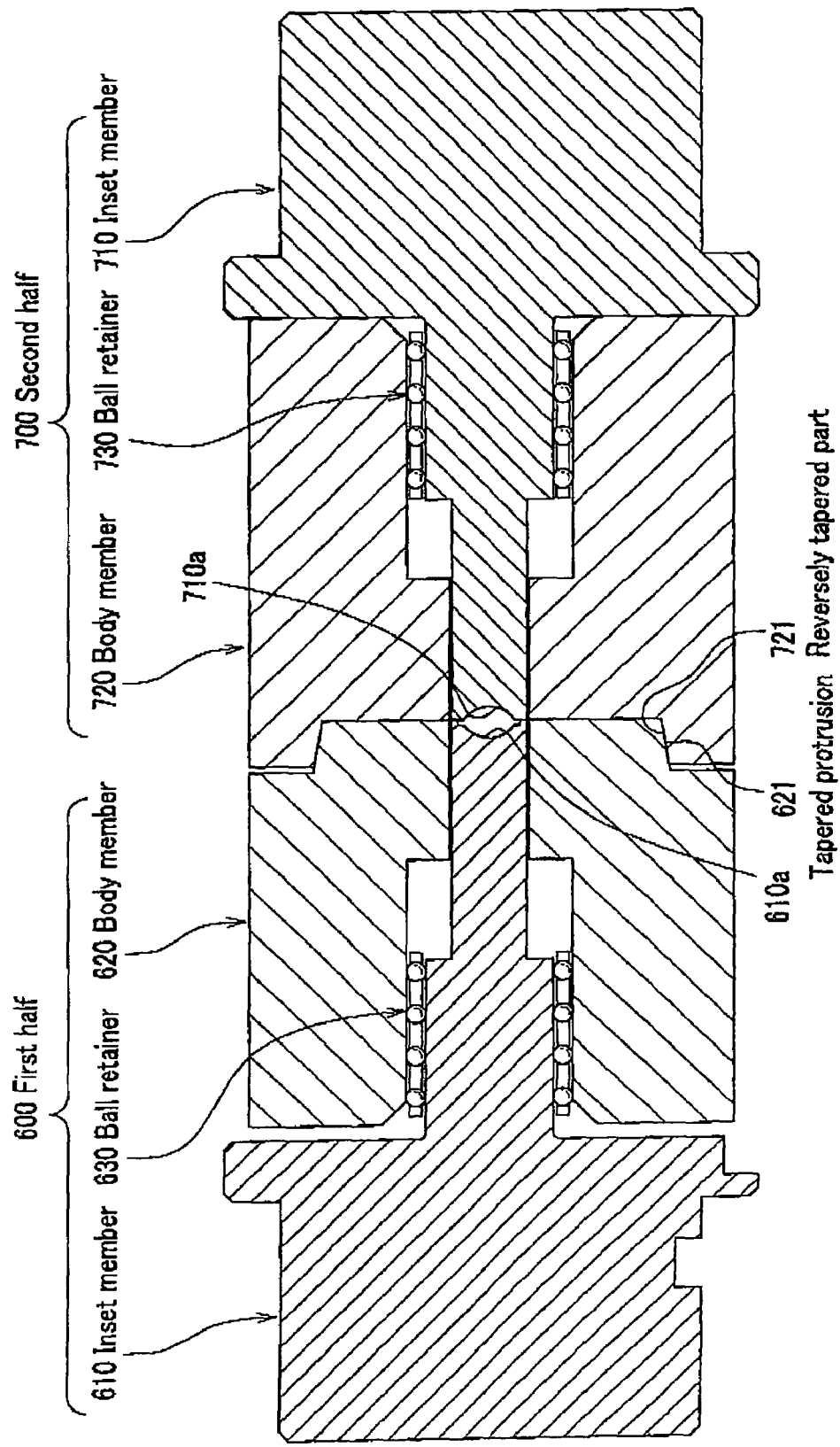
FIG. 9 is a cross sectional view showing a mold according to a conventional technology.

As shown in FIG. 8, a concave part 15 for molding a flange of a lens may be provided on the body member 13. In this case, the center axis alignment of the insert member 11 can be performed with respect to the body member 13 by interposing the insert member fixer 14 made of a shape memory alloy between the insert member 11, a portion of which forms an optical surface, and the insertion part 12 of the body member 13.

In the embodiments, examples are shown in which the first half 10 is provided with different configurations, however, the second half 20 can be provided with those configurations. Further, the cavity C may be formed not by two units but by three or more units.

Both the mold 1 and the mold 1' can be applied to any one of a vertical and a horizontal molding machines.

The insert member fixer 14 may be integrally configured with any one of the body member 13 and the insert member 11.

With this configuration, a step of setting up the insert member fixer 14 can be omitted, which enables a simple setup and an enhanced productivity. In addition, the number of components is decreased, which enables a cost reduction in machining and an enhanced handling of such components.

Further, since the insert member fixer 14 is integrally configured with any one of the body member 13 and the insert member 11, accuracy in setting up the insert member 11 is enhanced, and that in molding a product is also improved.

In the second embodiment, the insert member fixer 14 may change the shape thereof in a heat cycle in which a mold temperature is raised before filling a resin, and is lowered when the mold is cooled. Further, the insert member fixer 14 may restore its memorized shape using the mold temperature raised by filling the resin.

The invention claimed is:

1. A mold in which a cavity is formed between at least a first half and a second half, for molding a product in the cavity, the first half comprising:
   an insert member forming a cavity surface on one end side;
   a body member having an insertion part into which the insert member is inserted; and
   an insert member fixer interposed between the insert member and the insertion part of the body member, for holding the insert member,
   wherein the insert member fixer is made of a shape memory alloy,
   wherein, when the insert member fixer restores its memorized shape, the insert member fixer presses and holds the insert member such that a center axis alignment of the insert member with respect to the body member is performed,
   wherein the insert member fixer has gathers protruding toward the insert member in a state where the insert member fixer restores its memorized shape, at least when a product is molded, to press and hold a peripheral wall of the insert member inside an inner wall of the insertion part, and
   wherein each of said gathers has a wedge-shape cross section.

2. The mold according to claim 1, wherein a transformation temperature of the insert member fixer is higher than room temperature and lower than a temperature of the mold when a product is molded using at least the first half.

3. The mold according to claim 1, wherein a transformation temperature of the insert member fixer is set, at least in the first half, between a mold temperature during filling a resin and the mold temperature when a product is demolded.

4. The mold according to claim 1, wherein the insert member fixer is integrated with the body member.

5. The mold according to claim 2, wherein the insert member fixer is integrated with the body member.

6. The mold according to claim 3, wherein the insert member fixer is integrated with the body member.

7. The mold according to claim 1, wherein the insert member fixer is integrated with the insert member.

8. The mold according to claims 2, wherein the insert member fixer is integrated with the insert member.

9. The mold according to claim 3, wherein the insert member fixer is integrated with the insert member.

10. The mold according to claim 1, wherein the insert member fixer is disposed along a length of the insert member and in contact along the length when inserted in the body member with the insert member.

11. The mold according to claim 1, wherein said shape memory alloy comprises a Ni—Ti based material.

12. The mold according to claim 1, wherein the insert member fixer is cylindrical.

* * * * *